US012459301B2

(12) United States Patent
Voss

(10) Patent No.: US 12,459,301 B2
(45) Date of Patent: Nov. 4, 2025

(54) HEAVY TRUCK TIRE WITH SHOULDER RIB SIPE FEATURING BRIDGING

(71) Applicants: COMPAGNIE GENERALE DES ETABLISSEMENTS MICHELIN, Clermont-Ferrand (FR); Stefan Voss, Greer, SC (US)

(72) Inventor: Stefan Voss, Greer, SC (US)

(73) Assignee: Compagnie Generale des Etablissements Michelin, Clermont-Ferrand (FR)

(*) Notice: Subject to any disclaimer, the term of this patent is extended or adjusted under 35 U.S.C. 154(b) by 272 days.

(21) Appl. No.: 17/758,041

(22) PCT Filed: Apr. 21, 2020

(86) PCT No.: PCT/US2020/029049
§ 371 (c)(1),
(2) Date: Jun. 27, 2022

(87) PCT Pub. No.: WO2021/216041
PCT Pub. Date: Oct. 28, 2021

(65) Prior Publication Data
US 2023/0084725 A1 Mar. 16, 2023

(51) Int. Cl.
B60C 11/12 (2006.01)

(52) U.S. Cl.
CPC ........ B60C 11/1218 (2013.01); B60C 11/124 (2013.01); B60C 11/1259 (2013.01); B60C 2011/1213 (2013.01); B60C 2200/06 (2013.01)

(58) Field of Classification Search
CPC ............. B60C 11/1218; B60C 11/124; B60C 11/1259; B60C 2011/1213; B60C 11/1281; B60C 11/1263; B60C 11/0323
See application file for complete search history.

(56) References Cited

U.S. PATENT DOCUMENTS 4,878,526 A * 11/1989 Ochiai .................... B60C 11/12
152/DIG. 3
2010/0084062 A1* 4/2010 Miyazaki ................ B60C 11/12
152/209.18

(Continued)

FOREIGN PATENT DOCUMENTS

DE 737817 C * 7/1943
JP H06143943 A 5/1994

(Continued)

OTHER PUBLICATIONS

Kutsmichell Rudolf, English Machine Translation of DE 737817 C, 1943 (Year: 1943).*

(Continued)

Primary Examiner — Blaine Copenheaver
Assistant Examiner — Brendon Charles Darby
(74) Attorney, Agent, or Firm — Neal P. Pierotti

(57) ABSTRACT

The present invention provides for a heavy truck tire tread (12) with a plurality of sipes (20) in the shoulder rib (18) that extend from the shoulder edge (14) to the shoulder groove (16). Each one of the sipes (20) has a bottom (28) with a teardrop (30) located at the bottom, and the bottom (28) does not extend the same depth in the thickness direction across the entire lateral length of the sipe (20). The bottom (28) at a middle of the sipe (20) extends for less of a depth in the thickness direction than does the bottom (28) at a shoulder edge (14) portion of the sipe (20) located outboard from the middle of the sipe (20) in the lateral direction. The bottom (28) at the middle of the sipe (20) extends for less of a depth in the thickness direction than does the bottom (28) at a shoulder groove (16) portion of the sipe (20) located inboard from the middle of the sipe (20) in the lateral direction.

12 Claims, 6 Drawing Sheets

(56) References Cited

U.S. PATENT DOCUMENTS

| | | |
|---|---|---|
| 2012/0234443 A1 | 9/2012 | Kurokawa et al. |
| 2014/0130950 A1 | 5/2014 | Guichon |
| 2014/0166173 A1 | 6/2014 | Dayet et al. |
| 2019/0030958 A1 | 1/2019 | Caforio et al. |
| 2020/0001656 A1* | 1/2020 | Limroth ................. B60C 11/04 |
| 2020/0262245 A1* | 8/2020 | Mayni ................. B60C 11/0041 |

FOREIGN PATENT DOCUMENTS

| | | | |
|---|---|---|---|
| JP | 2005193815 A | 7/2005 | |
| WO | WO-2018102576 A1 * | 6/2018 | ......... B60C 11/0302 |
| WO | WO-2019066837 A1 * | 4/2019 | ........... B60C 1/0016 |
| WO | 2019226168 A1 | 11/2019 | |

OTHER PUBLICATIONS

European Patent Office, International Search Report dated Jul. 31, 2020, pp. 1-14 (included), European Patent Office, Rijswijk, The Netherlands.

* cited by examiner

HEAVY TRUCK TIRE WITH SHOULDER RIB SIPE FEATURING BRIDGING

CROSS-REFERENCE TO RELATED APPLICATIONS

The present application is a 35 U.S.C. § 371 application of PCT/US2020/029049 filed on Apr. 21, 2020 and entitled "Heavy Truck Tire With Shoulder Rib Sipe Featuring Bridging." PCT/US2020/029049 is incorporated by reference herein in its entirety for all purposes.

FIELD OF THE INVENTION

This invention relates generally to tire treads and tires. More specifically, this invention relates to tire treads and tires best suitable for the driven axles of heavy trucks that improves wet traction performance and reduces aggression damage and irregular wear.

BACKGROUND OF THE INVENTION

Tire treads generally extend about the outer circumference of a tire to operate as the intermediary between the tire and a surface upon which it travels (the operating surface). Contact between the tire tread and the operating surface occurs along a footprint of the tire. Tire treads provide grip to resist tire slip that may result during tire acceleration, braking, and/or cornering. Tire treads may also include tread elements, such as ribs or lugs, and tread features, such as grooves and sipes, each of which may assist in providing target tire performance when a tire is operating under particular conditions. The design of tires often results in improvement and compromise between tire properties such as traction, rolling resistance and wear/abnormal wear.

It is known that adding sipes in a tire rib can improve wear rate and traction, but it has not been used successfully in the shoulder ribs of tires for long-haul trucking applications because it may trigger abnormal wear that can include irregular wear and aggression damage. The shoulders of long-haul tires are therefore typically designed with solid ribs, with no full-width transverse sipes or full-depth transverse grooves. As a result, the design of long-haul tire treads sacrifices shoulder rib wear rate and traction in order to avoid abnormal wear. Coupling sipes in the shoulder rib with a reduced hysteresis tread rubber compound also becomes harder to do because these types of tread rubber compounds generally exhibit greater sensitivity to irregular wear and thus generally require a more robust tread design that is not susceptible to irregular wear.

The incorporation of lateral sipes, with or without teardrop features, into a shoulder rib may provide the benefits of improved wet traction, improved traction aspect, and a better management of wear rates with other areas of the tread. A need exists for a heavy truck tire having a continuous shoulder rib possessing a plurality of sipes having acceptable abnormal wear propensity, improved wet traction, improved traction aspect and better management of wear rates with other areas of the tread. As such, the incorporation of lateral sipes into a shoulder rib of a heavy truck tire may allow for variation and achievement of properties within the art of heavy truck tread design.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of the same or similar reference numerals in the figures denotes the same or similar features.

DETAILED DESCRIPTION OF PARTICULAR EMBODIMENTS

Figure 1:
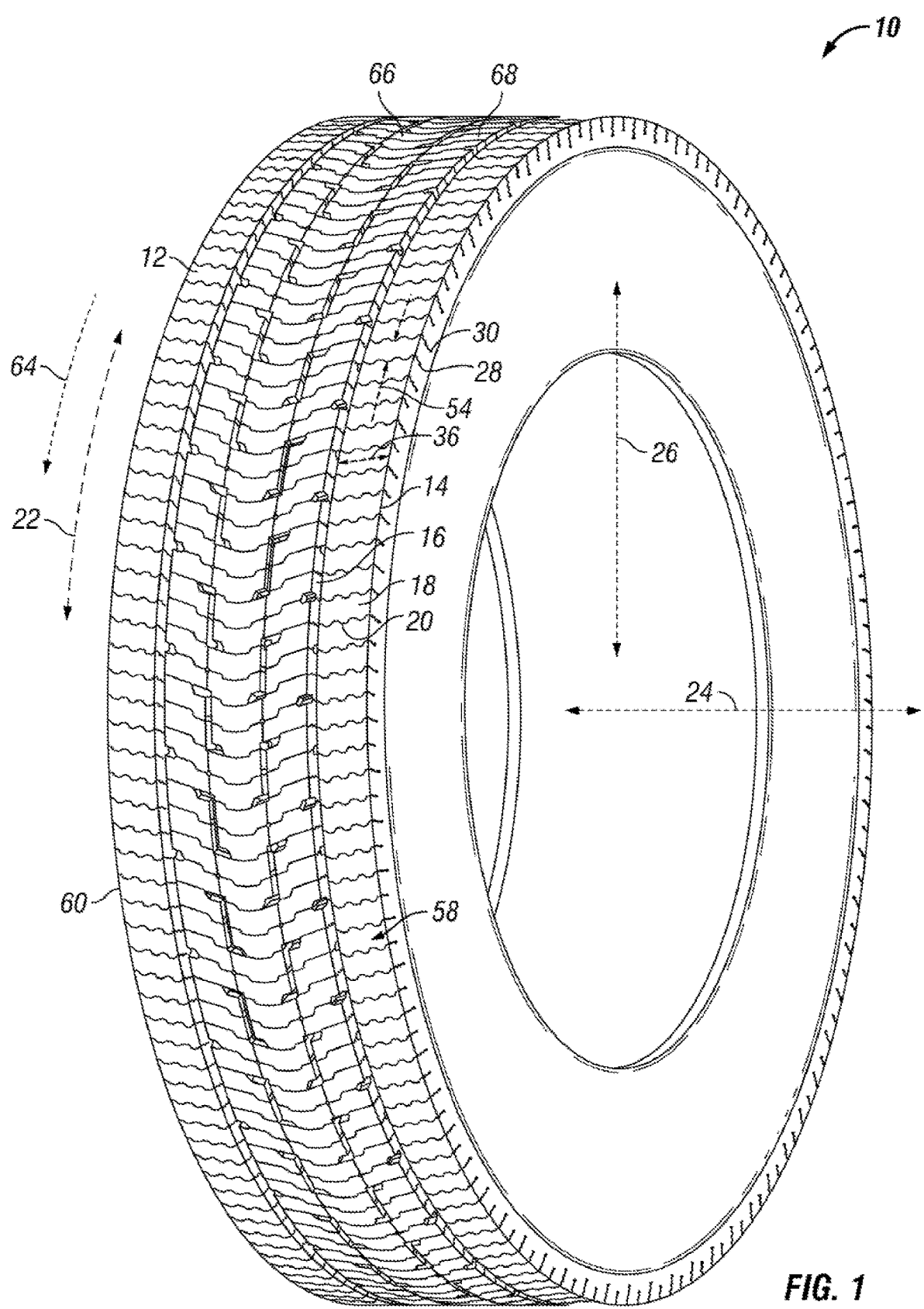
FIG. 1 is a perspective view of a heavy truck tire comprising an embodiment of the disclosed tire tread.

Reference will now be made in detail to embodiments of the invention, examples of which are illustrated in the drawings. These examples are provided by way of explanation of the invention.

As shown in FIG. 1, a heavy truck tire 10 has a crown portion with tread 12 connected by respective sidewalls to beads portions of the tire 10. The tread 12 shown in FIG. 1 comprises a tread 12 according to an embodiment of the invention. The design of the tread 12 is substantially symmetric, that is to say that the tread features are arranged substantially symmetrically about the center plane of the tread 12. This tread 12 is said to be of a directional design because it has a different appearance according to which side it is oriented. A directional tire 10 or tread 12 does not only look differently but it also performs differently if used in one rolling direction 64 or the other. This is why directional treads 12 or tires 10 conventionally bear markings that indicate the designed rolling direction 64. Such markings may take the form of arrows pointing in the designed rolling direction. Using the tire 10 for rolling in the opposite direction would be detrimental to its best performance. However, it is to be understood that the tire 10 and tread 12 as provided herein are not limited to being directional and that embodiments that are not directional are possible.

FIG. 1 shows various directions of the tire 10 and tread 12 such as the longitudinal direction 22, also referred to as the circumferential direction of the tire 10, which can be the forward or rearward direction of rolling of the tire 10. The rolling direction 64 is the forward direction of travel in the longitudinal direction 22. A lateral direction 24, also referred to as the axial or transverse direction, is parallel to a central axis of the tire 10 about which the tire 10 rotates. The lateral direction 24 may be perpendicular to the longitudinal direction 22. A thickness direction 26, which may also be referred to as the tread depth direction or radial direction is identified. The thickness direction 26 can be the thickness of the tread 12 when the tread 12 is provided as a retread band and is flat. The thickness direction 26 is radial and thus is in multiple directions 360 degrees about the central axis which extends in the lateral direction 24. The thickness direction 26 shown in FIG. 1 is but one location of the thickness direction 24 and it is to be understood that others extending through other areas of the tread 12 perpendicular to the central axis are also present. The tread 12 depth is generally defined as the distance between the tread contact surface and a translation of this contact surface to be tangent to the deepest features in the tread 12. The tread 12 has an outer surface that extends 360 degrees about the central axis and that engages the ground 62 when rolling. The tire 10 can be a drive tire of a tractor trailer.

The tread 12 has a rolling tread width in the lateral direction 24 that extends from a shoulder edge 14 on one side of the tread 12 to a shoulder edge 60 on an opposite side of the tread 12. The shoulder edges 14, 60 are generally straight, but if notches are present at these locations, then the shoulder edges 14, 60 could extend in the lateral direction 24 at these points to define shoulder edges 14, 60 that are not completely oriented only in the longitudinal direction 22. The tread 12 has several longitudinal grooves that extend 360 degrees completely around the entire tire 10 in the longitudinal direction 22. One of the longitudinal grooves is identified as shoulder groove 16 which is the longitudinal groove closest to the shoulder edge 14 in the lateral direction 24. A shoulder rib 18 is defined between the shoulder groove 16 and the shoulder edge 14. The shoulder groove 16 is an open groove in that it is generally open with its bottom visible when looking at the outer surface 58. The tread 12 includes additional ribs such as a center rib 66 which is at the center of the tread 12 in the lateral direction 24. An intermediate rib 68 is between the center rib 66 and the shoulder rib 18. A partially hidden groove is between the intermediate rib 68 and the center rib 66 and upon wear of the tread 12 through normal use can become more open or fully open depending upon the cross-sectional design of the partially hidden groove. It is to be understood that in other embodiments any one or combination of open, hidden, or partially hidden longitudinal grooves can be employed. The other side of the tread 12 in the lateral direction 24 may be symmetrical and include the same features as previously discussed. The other side has an intermediate rib, a shoulder rib with the shoulder edge 60, an open shoulder groove, and a partially hidden center/intermediate groove. Although shown as incorporating a pair of intermediate ribs, other embodiments of the tread 12 may lack intermediate ribs. Further, all of the grooves may be open grooves, hidden grooves, or partially hidden grooves in accordance with various embodiments.

Figure 2:
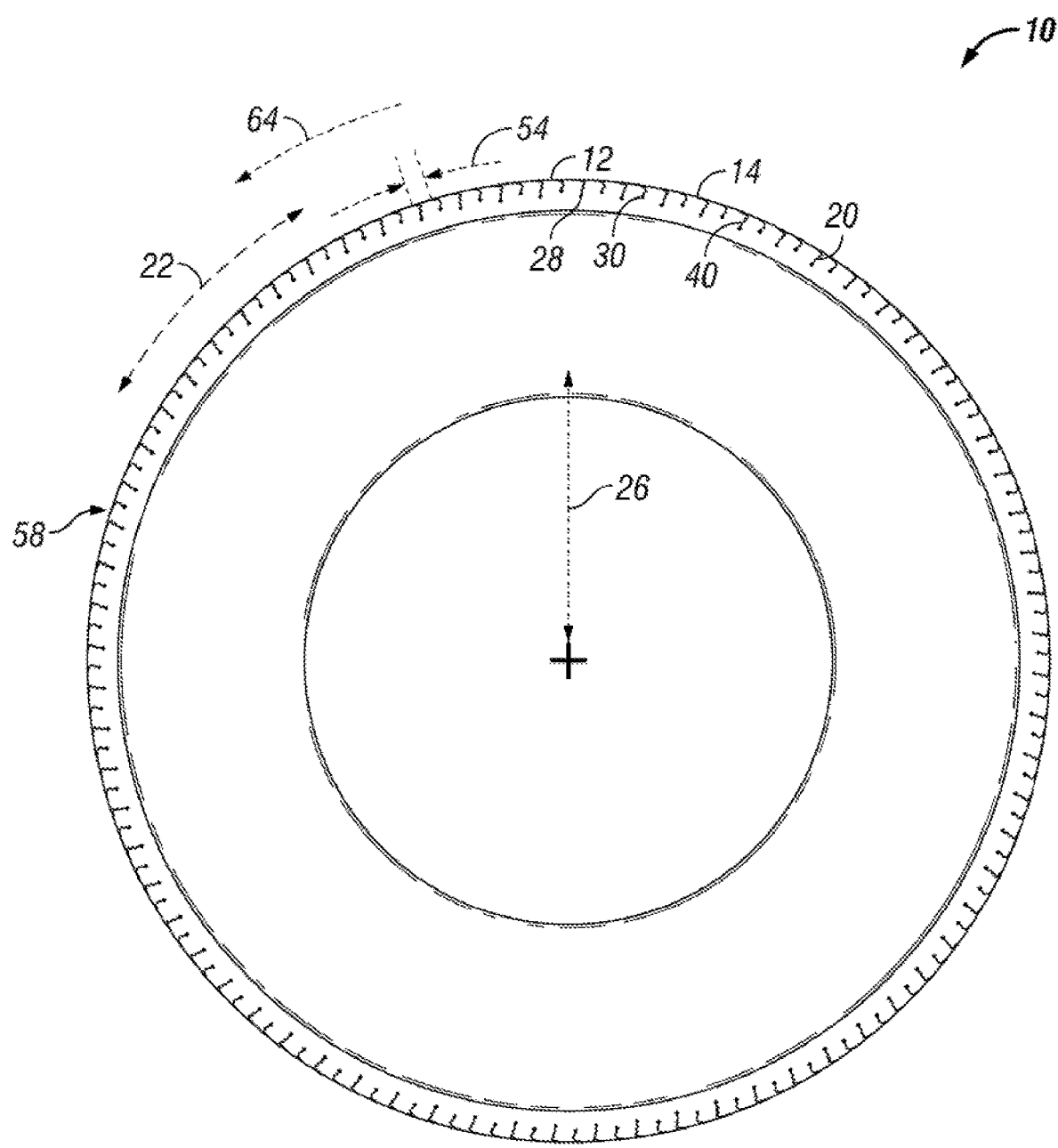
FIG. 2 is a right side view of the tire of FIG. 1.

The longitudinal grooves such as the partially hidden grooves and the shoulder groove 16 can have a width of over two millimeters. Sipes 20 are present in the tread 12 and extend from the outer surface 58 of the shoulder rib 18 into tread 12 some amount in the thickness direction 26. Although the sipes 20 are in the shoulder rib 18, they may be in any other part of the tread 12 in other embodiments. The sipes 20 are narrower than the grooves in width and may have a width that is two millimeters or less. The sipes 20 in the shoulder rib 18 extend across the entire width of the shoulder rib 18 such that the sipes 20 engage the shoulder groove 16 and the shoulder edge 14. A side view of the tire 10 is shown in FIG. 2 and it can be seen that the sipes 20 extend 360 degrees around the entire length of the tire 10 in the longitudinal direction 22. The sipes 20 extend different distances into the tread 12 from the outer surface 58 in the thickness direction 26 as shown, and the sipes 20 repeat in a pattern so that immediately successive sipes 20 to one of the sipes 20 have a different depth. The pattern is arranged so that one sipe 20 extends less of a distance into the tread 12, the next successive sipe extends more of a distance, the next successive sipe extends less of a distance into the tread 12, and so forth all the way around the tire 10. However, this is but one embodiment and it is to be understood that in other versions the sipes 20 all extend the same distance into the tread 12 in the thickness direction 26 such that successive sipes 20 in the longitudinal direction 22 extend the same amount as one another in the thickness direction 26 into the tread 12.

Figure 3:
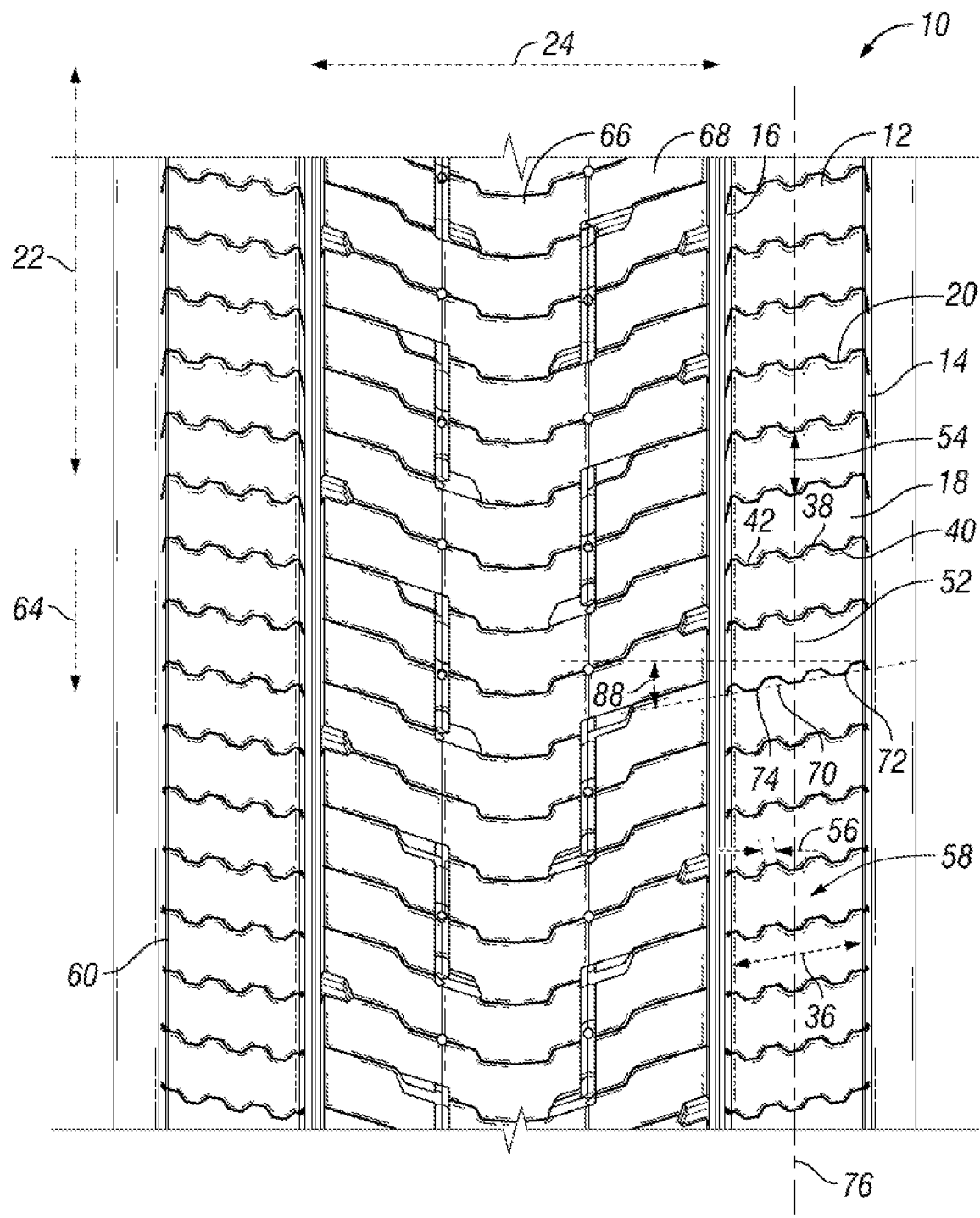
FIG. 3 is a front view of the tread of FIG. 1.

FIG. 3 is a close up view of the tread 12 of FIG. 1 in a flat layout and could be the tire 10 flattened out, or a tread band that is flat. The sipes 20 are narrow spaces formed in the tread 12 between walls of material over a depth at most equal to the tread depth, said walls being able in some embodiments to come into contact with one another in the usual running conditions of the tire 10. The sipes 20 are full depth sipes. Sipes 20 are said to be full depth sipes when their average depth in the thickness direction 26 is at least 50% of the tread 12 depth. In some versions of the tread 12 a mixture of sipes 20 can be present that do not extend to at least 50% of the tread 12 depth, and that do extend to at least 50% of the tread 12 depth. The sipes 20 are oriented to extend in the lateral direction 24 or to be angled relative to the lateral direction 24 but not at that much of an angle to the lateral direction 24.

The sipe 20 need not extend completely in a linear direction from the shoulder edge 14 to the shoulder groove 16. As shown in FIG. 3 the sipes 20 have a wave like extension in the lateral direction 24 and may be referred to as castle-type sipes 20. Since the sipes 20 may not extend completely in a linear direction, to determine their angle to the lateral direction 24 an average sipe line 70 is defined for each particular sipe 20. The average sipe line 70 is defined by measuring inboard in the lateral direction 24 eight millimeters from the shoulder edge 14 and placing point 72 at the sipe 20 at this location in the lateral direction 24. Next, one may measure eight millimeters outboard from the shoulder groove 16 and denote point 74 at the sipe 20 at this location. The average sipe line 70 is drawn from point 72 to point 74, and a line completely in the lateral direction 24 extends through the point 72 and the average sipe line angle 88 is measured between the average sipe line 70 and this line. The average sipe line angle 88 may be 20 degrees or less in accordance with certain exemplary embodiments. In some instances the average sipe line angle 88 is 0 degrees. In other instances, the average sipe line angle is from 0 degrees to 30 degrees. In yet other arrangements the average sipe line angle 88 is from 0 degrees to 65 degrees.

Figure 4:
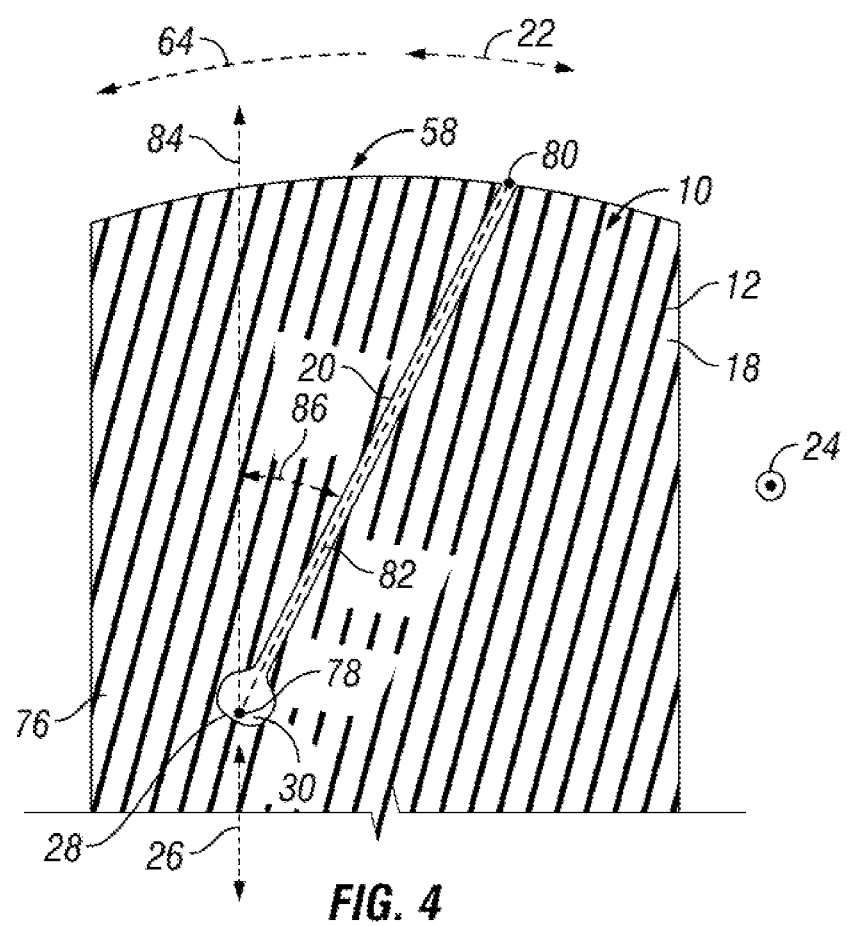
FIG. 4 is a detailed cross-sectional view taken from a plane cut in the longitudinal direction of a portion of the tire of FIG. 1.

The angularity of the sipe 20 in the thickness direction 26 may be described with reference to FIG. 4 that shows a cross-sectional view through the shoulder rib 18 in a reference plane 76 oriented in the longitudinal direction 22. The sipe 20 in this view has a negative inclination angle. The sipe 20 is straight in shape and has a constant cross-sectional shape and extends down into the tread 12 at an angle to the thickness, radial direction 26. A sipe top point 80 is present at the top of the sipe 20 at the outer surface 58. The sipe 20 extends into the tread 12 until it terminates at a sipe bottom 28 which is the location farthest from the opening at the sipe top point 80. The bottom 28 is located in the teardrop 30 of the sipe 20. A sipe bottom point 78 is noted at a location at the sipe bottom 28. A sipe inclination line 82 extends from the sipe bottom point 78 to the sipe top point 80. The teardrop 30 can be sized so that its average diameter 50 is greater than the width of the sipe 20 that is outside of its teardrop portion 30. The teardrop 30 can be provided in various cross-sectional shapes, and can have a cross-sectional diameter 50 that is 4 millimeters. In other embodiments the teardrop 30 has a cross-sectional diameter 50 that is greater than 2 millimeters.

A reference line 84 extends through the sipe bottom point 78 and through the outer surface 58. The reference line 84 is oriented completely in the thickness direction 26 and does not have a component in the longitudinal/circumferential direction 22 or the lateral/axial direction 24. The inclination of the sipe 20 is observed upon comparison of the orientation of the sipe inclination line 82 to the reference line 84. The sipe inclination line 82 is oriented at a sipe inclination angle 86 to the reference line 84. The sipe inclination angle 86 may be any magnitude greater than 0 degrees. The sipe inclination angle 86 may from 1 degree to 5 degrees, from 5 degrees to 10 degrees, or zero to up to 10 degrees. The sipe inclination angle 86 in other embodiments may be from 10 degrees to 45 degrees, from 11 degrees to 45 degrees, from 10 degrees to 20 degrees, from 11 degrees to 20 degrees, from 10 degrees to 15 degrees, from 13 degrees to 23 degrees, from 15 degrees to 28 degrees, from 15 degrees to 30 degrees, from 18 degrees to 28 degrees, from 20 degrees to 25 degrees, from 20 degrees to 45 degrees, or from 12 degrees to 23 degrees in accordance with various exemplary embodiments. Further, various embodiments exist in which the sipe inclination angle 86 is zero degrees so that the sipe 20 is not angled relative to the thickness direction 26. If a sipe inclination angle 86 greater than 0 degrees is present, it may be the case that the tread 12 is directional in nature.

The inclination of the sipe inclination line 82 to the reference line 84 is negative in direction in that it is against the rolling direction 64 of the tread 12. In this regard, the sipe bottom point 78 is configured to enter the contact patch of the tread 12 as it engages the ground before the sipe top point 80. The reference line 84, the sipe bottom point 78, the sipe inclination line 82, the sipe top point 80, and the sipe inclination angle 86 all fall within a reference plane 76. The cross-section in FIG. 4 likewise falls within the reference plane 76 so all of these elements can be viewed in relation to one another. FIG. 3 shows the orientation and location of the reference plane 76 relative to the rest of the tread 12. As shown, the reference plane 76 is oriented in the longitudinal/circumferential direction 22 such that the longitudinal/circumferential direction 22, and the rolling direction 64, lies within the reference plane 76. The lateral/axial direction 24 is perpendicular to the reference plane 76.

Although shown as being straight in extension, the sipe 20 can include undulations in other embodiments. If undulations in the sipe 20 exist, the points 72 and 74, and lines 82 and 84 and angle 86 are defined in the same way as previously discussed. The sipe 20 inclination line 82 is not present within the sipe 20 at certain locations due to the undulations. Although described as having a "negative" sipe inclination line 82 it can be a positive inclination in other embodiments. Further, it may be the case that in some instances, the sipe inclination angle 86 is not the same magnitude along the entire length of the sipe 20 from the shoulder edge 14 to the shoulder groove 16. It is to be understood that various exemplary embodiments exist in which the sipes 20 are straight, heavily undulated, and undulated but not heavily undulated in configuration in the lateral direction 24.

The sipes 20 of the present disclosure can have a spacing 54 in the longitudinal direction 22 between successive sipes 20 that is 15 to 40 millimeters. In some instances, the spacing is from 5 to less than 18 millimeters, and in some instances 10 millimeters. In other embodiments, the spacing is from 5-7 millimeters, from 7-11 millimeters, from 11-15 millimeters, from 15-18 millimeters, from 5-10 millimeters, from 15-18 millimeters, from 10-18 millimeters, or from 8-13 millimeters. Successive sipes 20 may be configured in the same manner as one another in some embodiments so that all of the sipes 20 of the shoulder rib 18 are identical to one another. The spacing 54 may be constant from one sipe 20 to the next successive sipe 20 so that the sipes 20 are identical in shape to one another and simply spaced from one another in the longitudinal direction 22 the amount of spacing 54. The spacing can be measured at any lateral location of the sipe 20. The successive sipes 20 can be arranged so that all spacing 54 located at all locations in the lateral direction 24 are spaced from 5-18 millimeters from one another and are all the same value as one another. If some of the sipes 20 are not symmetric but instead result in successive sipes 20 with some spacing 54 outside of the 5-18 millimeter range, then if there are at least two successive sipes 20 within the shoulder rib 18 that do still include spacing 54 along their entire lengths that is from 5-18 millimeters then such tread 12 falls within the second feature as defined herein. The spacing 54 can be measured at the outer surface 58. The sipes 20 may also be set up so that successive sipes 20 do not have the same spacing between one another at some or all of their common locations in the lateral direction 24. A high amount of sipes 20 can be placed into the shoulder rib 18 so that the shoulder rib 18 has a high degree of lamellization. In some embodiments the spacing 54 is less than 20 millimeters but not less than 5 millimeters. The shoulder rib 18 may include the sipes 20, but may not include any grooves (greater than 2 millimeters in width), large cuts, or blocks.

FIG. 3 shows the sipes 20 being castle-type in shape when viewed on the outer surface 58. The undulations can be zig-zagging, a single S-shape, a dog-leg shape, a square U-shaped configuration, an arc, or otherwise in alternate embodiments. Undulated sipes 20 promote tread 12 stiffness due to the sipe walls interlocking when loaded on the ground. Undulations may have many different shapes and can typically be one-directional or bi-directional, and the shapes (such as the zig-zags) can be along some or all of the entire depth of the sipe 20 in the thickness 26 and longitudinal 22 directions. FIG. 3 also illustrates the fact that the local sipe angle may vary to a large extent while the average sipe line angle 88 is maintained less than 20 degrees. The castle-type sipes 20 may be arranged to achieve a higher level of lateral blocking as opposed to egg-crate style sipe interlocking. The step length 56 size of the sipes 20 may be 4.5 to 5.5 millimeters in some embodiments. An egg-crate style sipe 20 has a sinusoidal shape on the outer surface 58 and also a sinusoidal shape extending into the tread 12 in the thickness direction 26. The castle-type sipes 20 could also have a sinusoidal shape extending into the tread 12 in the thickness direction 26. Other sipe 20 shapes are possible such as one that has an egg-crate/sinusoidal shape at the outer surface 58 but a straight shape upon extension into the tread 12 in the thickness direction 26, and ones that have a linear shape at the outer surface 58 but a sinusoidal shape in the thickness direction 26. In some embodiments as disclosed herein, the sipes 20 may be castle-type sipes 20 in which the length 56 is greater than 1 millimeter and is instead from 1.7 millimeters to 2.3 millimeters.

Any number of the sipes 20 as described can be present in the tread 12. In some instances, all of the sipes 20 of the shoulder rib 18 are as described, and in other embodiments only some of the sipes 20 are as described. Further, although described as being in the shoulder rib 18, the sipes 20 as described may also additionally be in the center rib 66 and/or the intermediate rib 68. The measurements may be taken at the outer surfaces 58 of a new tire 10 or tread 12. The tread 12 may also have shallow depressions, markings or engravings. Such shallow features and are intended to wear out during the early wear life of the tread 12 and do not affect the stiffness of the ribs 18. The sipes 20 can have various features such as edges with radii, and zig-zag shapes.

Figure 5:
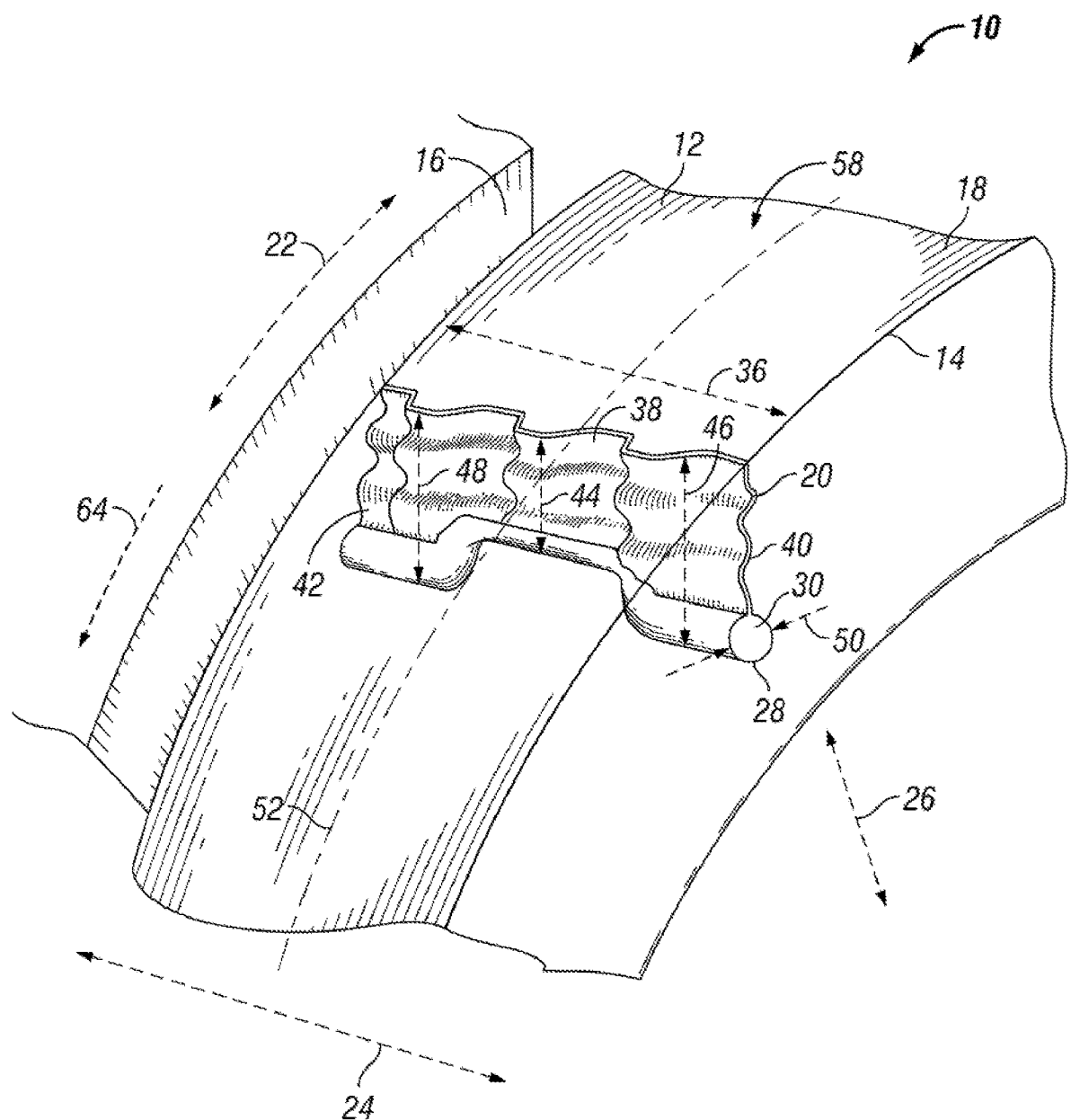
FIG. 5 is a perspective view of a portion of a tread that shows the configuration of the sipe with bridging in accordance with one exemplary embodiment.
Figure 6:
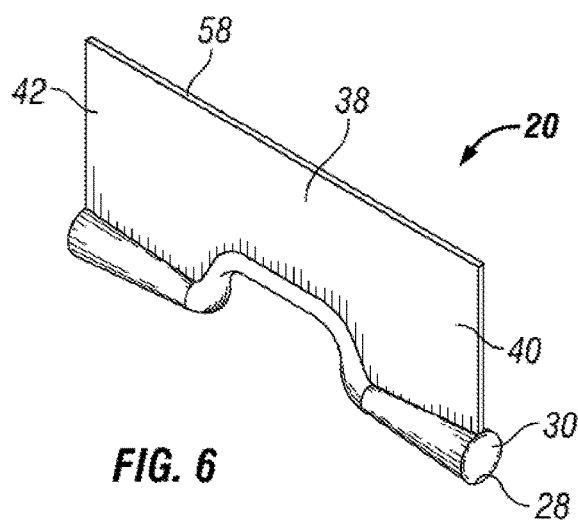
FIG. 6 is a perspective view of a sipe in accordance with one exemplary embodiment.
Figure 7:
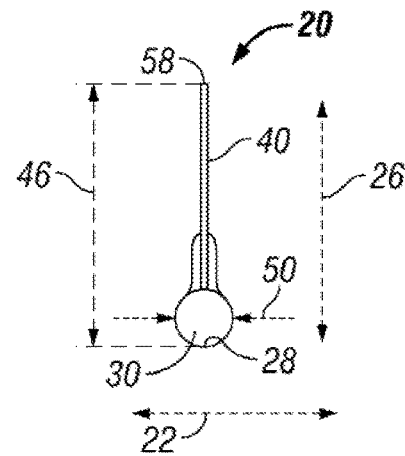
FIG. 7 is a right side view of the sipe of FIG. 6.

FIG. 5 shows a sipe 20 in the shoulder rib 18 in accordance with one exemplary embodiment. The sipe 20 includes bridging in the center of the sipe 20 which brings robustness for both aggression and irregular wear performance of the tread 12. Cracking in sipes 20 generally starts at the center of the sipe 20. The incorporation of bridging results in a reduced depth of the sipe 20 in its middle in the lateral direction 24 which minimized or eliminates cracking that would otherwise occur in the sipe 20. The sipe 20 has a width at the outer surface 58 that is 2 millimeters or smaller. The sipe 20 extends from the outer surface 58 into the tread 12 in the thickness direction 26 in undulations all the way to the teardrop 30 of the sipe 20, that is the portion of the sipe 20 farthest from the outer surface 58. The teardrop 30 extends across the entire lateral length of the sipe 20 so that it extends from the shoulder edge 14 to the shoulder groove 16.

The sipe 20 is shown in detail with reference to FIGS. 6-10, and differs from that illustrated with reference to FIG. 5 in that it does not have undulations but instead a straight section from the upper surface 58 to the teardrop 30. As described, the undulations of the sipe 20 may be in the lateral 24 and/or thickness direction 26. Further, the teardrop 30 is configured differently in the FIG. 5 embodiment in comparison to the embodiment in FIGS. 6-10. The sipe 20 in FIGS. 6-10 is not shown within the tread 12 for purposes of clarity, but it is to be understood that the sipe 20 shown in FIGS. 6-10 can be within the tread 12 as shown and described herein. The sipe 20 has a lateral length 36 which is the length of the sipe 20 in the lateral direction 24. If the sipe 20 is angled relative to the lateral direction 24, the lateral length 36 of the sipe 20 would likewise be angled and would be measured between the points of intersection of the sipe 20 with the shoulder edge 14 and the shoulder groove 16.

Figure 8:
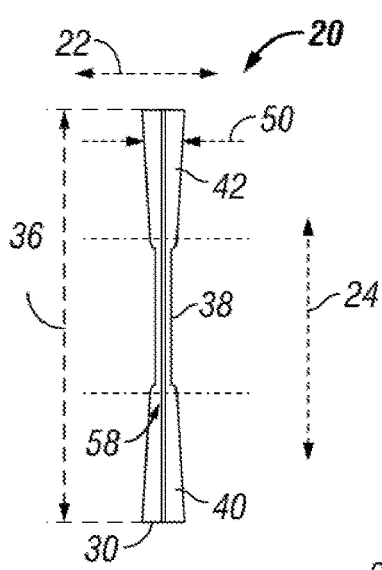
FIG. 8 is a top view of the sipe of FIG. 6.
Figure 9:
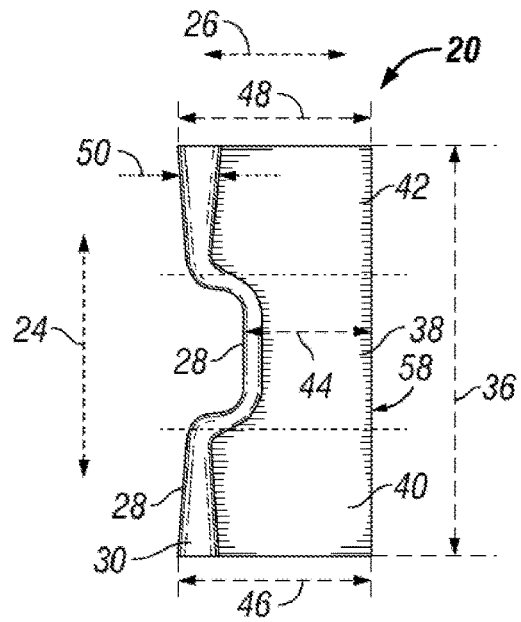
FIG. 9 is a front view of the sipe of FIG. 6.
Figure 10:
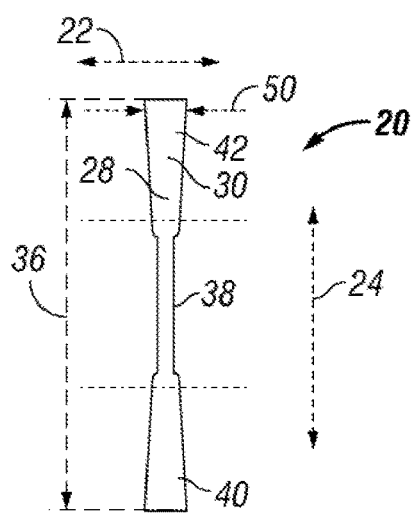
FIG. 10 is a bottom view of the sipe of FIG. 6.

The sipe 20 is divided up into three different portions along its lateral length 36. The sipe 20 has a shoulder edge portion 40 which is the portion of the sipe 20 that engages the shoulder edge 14 and is closest to the shoulder edge 14. The sipe also has a shoulder groove portion 42 that is the portion of the sipe 20 that engages the shoulder groove 16 and is closest to the shoulder groove 16 in the lateral direction 24. The third portion of the sipe 20 is the middle 38 which is between the shoulder edge portion 40 and the shoulder groove portion 42. The portions 38, 40, 42 are distinguished from one another by the inclusion of bridging in the middle 38, and no bridging in the shoulder edge portion 40 and the shoulder groove portion 42. The boundary lines between these portions 38, 40, 42 are illustrated in FIGS. 8-10 and are located at the lateral positions where the middle portion 38 begins to move upwards to the outer surface 58 in the thickness direction 26.

The teardrop 30 extends along the entire lateral length 36 and has a circular diameter 50, although the teardrop 30 need not have a circular cross-sectional shape in accordance with other exemplary embodiments. The teardrop 30 has a diameter 50 that is greater than the width of the sipe 20 that extends from the teardrop 30 to the outer surface 58. The sipe 20 has a bottom 28 that is located at the teardrop 30 since the teardrop 30 is at the bottom of the sipe 20 in the thickness direction 26. The bottom 28 is the location of the sipe 20 that is deepest into the tread 12 in the thickness direction 26. The bottom 28 is a line that extends along the lateral length 36 at the teardrop 30. The location of the bottom 28 relative to the outer surface 58 is not constant along the entire lateral length 36 so that the bottom 28 at some portions are closer to the outer surface 58 than it is at other portions of the sipe 20. The shoulder edge portion 40 has a shoulder edge portion depth 46 that is the distance from the outer surface 58 to the bottom 28 at the shoulder edge portion 40. As previously discussed, the top of the sipe 20 is located at the outer surface 58, and the bottom 28 of the shoulder edge portion 40 that is used to determine the shoulder edge portion depth 46 is the bottom 28 in the shoulder edge portion 40 that is farthest from the outer surface 58. The bottom 28 throughout the shoulder edge portion 40 is inclined so that it is not consistent along the entire length at the shoulder edge portion 40. The shoulder edge portion depth 46 is measured at the bottom 28 of the shoulder edge portion 40 that is farthest from the outer surface 58, and is thus the maximum shoulder edge portion depth 46 of the shoulder edge portion 40.

If teardrop 30 is inclined in the shoulder edge portion 40 and the shoulder groove portion 42, the middle portion 38 may additionally be identified as the part of the sipe 20 where the convex outside shape of the teardrop 30 begins thus causing the sipe 20 to more noticeably extend closer to the outer surface 58 in the thickness direction 26. With reference back to FIG. 3, the shoulder rib 18 has a lateral center 52 that is the midpoint of the shoulder rib 18 in the lateral direction 24. The lateral center 52 extends through the middle portion 38 such that the middle portion 38 is located at the lateral center 52. It may be the case that equal portions of the middle portion 38 are on either side of the lateral center 52 in the lateral direction 24. Alternatively, a greater or lesser amount of the middle 38 may be located on one side of the lateral center 52 in the lateral direction 24 in other embodiments. As can be seen in FIGS. 8 and 10, the teardrop 30 is tapered such that the diameter 50 of the teardrop 30 decreases in size upon extension from the shoulder edge 14 to the middle 38, and so that the diameter 50 of the teardrop 30 decreases in size upon extension from the shoulder groove 16 to the middle 38. The diameter 50 is the same in the middle 38 throughout the majority of the length of the middle 38 in the lateral direction 24. As such, the diameter 50 can have the same magnitude along the entire lateral length 36, or can have variable magnitudes along the lateral length 36. Various embodiments exist in which the cross-section of the teardrop 30 is circular in shape and the diameter 50 is greater than 2 millimeters.

The bottom 28 of the shoulder groove portion 42 is likewise inclined so that it does not have one consistent shoulder groove portion depth 48 along the entire shoulder groove portion 42. The deepest part of the shoulder groove portion 42 is measured as the shoulder groove portion depth 48 so that the shoulder groove portion depth 48 that is reported is the maximum one within the shoulder groove portion 42. The shoulder edge portion depth 46 and the shoulder groove portion depth 48 are the same are the same in magnitude as one another.

The bottoms 28 of the shoulder groove portion 42 and the shoulder edge portion 40 are inclined relative to the outer surface 58 so that the depths 46, 48 are not as great at the middle portion 38, and so that the depths 46, 48 are maximized at the shoulder edge 14 and the shoulder groove 16. The sipe 20 of the embodiment shown in FIG. 5 does not have bottoms 28 that are angled in the shoulder groove portion 42 or the shoulder edge portion 40 so that the depths 46, 48 are the same as one another along the entire lateral lengths of both the shoulder groove portion 42 and the shoulder edge portion 40. With reference back to the embodiment shown in FIGS. 6-10, this embodiment has a shoulder edge portion 40 and a shoulder groove portion 48 that has their maximum depths being the shoulder edge portion depth 46 located at the shoulder edge 14, and the shoulder groove portion depth 48 located at the shoulder groove 16. The depths 46 and 48 are the same in magnitude.

The middle portion 38 has a depth 44 that extends from the outer surface 58 to the bottom 28 in the middle portion 38 in the thickness direction 26. As the location of the bottom 28 relative to the outer surface 58 may change in the thickness direction 26 at different locations of the bottom 28 in the middle portion 38, for purposes of measurement the depth 44 is measured so that it is the smallest in magnitude in the middle portion 38. In this regard, the depth 44 is measured at the location of the bottom 28 in the middle portion 38 that is closest to the top of the sipe 20/outer surface 58 in the thickness direction 26. The depth 44 is smaller in magnitude than the shoulder edge portion depth 46, and the depth 44 is smaller in magnitude than the shoulder groove portion depth 48. This being the case, the sipe 20 is configured to have bridging at its center as opposed to its ends in the lateral direction 24. The teardrop 30 follows along the entire section of bridging in the middle 38 and is not discontinuous in the middle portion 38, and in fact the teardrop 30 extends along the entire lateral length 36 so that it is continuous from the shoulder edge 14 to the shoulder groove 16. The size of the sipe 20 is decreased in the center of the sipe 20 due to the bridging arrangement which functions to reduce or eliminate cracking that would otherwise occur at the center of the sipe 20.

The shoulder rib 18 is a continuous rib 18 along the entire circumferential length of the tire 10 in the longitudinal direction 22 and does not include any grooves. Although sipes 20 are present in the shoulder rib 18, the sipes are 2 millimeters or less. The grooves have a width that is greater than 2 millimeters. The incorporation of grooves into the shoulder rib 18 would cause it to be composed of a series of blocks as the grooves would extend from the shoulder edge 14 to the shoulder groove 16. The present disclosure does not incorporate any grooves into the shoulder rib 18 so that it is not provided as a series of blocks but instead is a continuous rib 18 having sipes 20 therein. The incorporation of sipes 20 into the shoulder rib 18 may match the design of the central ribs in the tread 12 which could also have sipes located therein, thus resulting in all of the ribs having a more balanced wear potential.

Any type of tread material may be used with the presently disclosed tread 12 geometry. In some embodiments a low hysteresis tread material is used. Hysteresis can be measured by the tan(δ) value of the rubber making up the tread 12. The loss factor "tan(δ)" is a dynamic property of the rubber compound. It is measured on a viscosity analyzer (Metravib VA4000) according to Standard ASTM D5992-96. The response of a test specimen consisting of two cylindrical pellets each 2 mm thick and one centimeter in diameter is recorded (the test specimen is made from samples taken from a tire mid-way up the height of the zone concerned as close as possible to the region of the equatorial plane in a region that is thick enough to be able to form the test specimen), the specimen being subjected to simple alternating sinusoidal shear loadings at a frequency of 10 Hz, at a temperature of 60° C. The sweep covers amplitude of deformation from 0.1% to 25% peak to peak (on the outbound cycle) then from 25% to 1% peak to peak (on the return cycle). The results that are used here are the loss factor tan(δ) and the complex dynamic shear modulus. The complex dynamic shear modulus is denoted "G*25" in reference to the 25% strain applied during the test. During the outbound cycle, the maximum value of tan δ that is observed is denoted "max tan(δ)". Embodiments of the tread 12 with the disclosed geometries may have a max tan(δ) that is from 0.07 to 0.13. In other arrangements, the max tan(δ) of the tread 12 material is 0.13. In some arrangements, the max tan(δ) is from 0.09 to 0.11. In yet other arrangements, the max tan(δ) is from 0.11 to 0.13. Also, it is to be understood that as used herein that ranges, such as for example "from 10 to 50", or "between 10 and 50", include the values between the two numbers and also include the numbers themselves.

It will be apparent to those skilled in the art that various modifications and variations can be made in the present invention without departing from the scope or spirit of the invention. For instance, features illustrated or described as part of one embodiment, can be used with another embodiment to yield a still further embodiment. As already discussed above, a tread or tire according to the invention may also comprise tread halves that are notably different from one another as long as each tread half remains within the scope of the invention as limited by the claims. Thus, it is intended that the present invention covers such modifications and variations as they fall within the scope of the appended claims and their equivalents.

The invention claimed is:

1. A heavy truck tire tread having a longitudinal direction, a lateral direction and a thickness direction, said tread comprising:

a shoulder edge;

a shoulder groove;

a shoulder rib defined between the shoulder edge and the shoulder groove, wherein the shoulder rib has an outer surface;

a plurality of sipes in the shoulder rib that extend from the shoulder edge to the shoulder groove, wherein each one of the sipes has a bottom with a teardrop located at the bottom, wherein the teardrop extends continuously along an entire lateral length of the sipe from the shoulder edge to the shoulder groove, wherein the bottom does not extend the same depth in the thickness direction across the entire lateral length of the sipe, wherein the bottom at a middle of the sipe extends for less of a depth in the thickness direction than does the bottom at a shoulder edge portion of the sipe located outboard from the middle of the sipe in the lateral direction, and wherein the bottom at the middle of the sipe extends for less of a depth in the thickness direction than does the bottom at a shoulder groove portion of the sipe located inboard from the middle of the sipe in the lateral direction;

wherein the teardrop is tapered upon extension from the shoulder groove towards the middle of the sipe such that the bottom extends for less of a depth in the thickness direction continuously from the shoulder groove to a first convex portion of the bottom at the middle of the sipe, wherein the bottom has a first concave portion that is located between the first convex portion and the shoulder groove;

wherein the bottom has a second convex portion at the middle of the sipe, and wherein the bottom has a second concave portion that is located between the second convex portion and the shoulder edge;

wherein the teardrop is circular in shape and has a diameter, wherein the diameter does not have the same magnitude along the entire lateral length of the sipe;

wherein the teardrop at the middle of the sipe has a straight segment that extends in the lateral direction but does not extend in the thickness direction, wherein the diameter of the teardrop at the straight segment is smaller than the diameter of the teardrop at a first tapered segment of the teardrop in the shoulder groove portion, and wherein the diameter of the teardrop at the straight segment is smaller than the diameter of the teardrop at a second tapered segment of the teardrop in the shoulder edge portion;

wherein the teardrop has a top that is a portion of the teardrop closest to the outer surface in the thickness direction, wherein the top has a first convex top portion that engages the first tapered segment, wherein the top extends continuously in both the thickness and lateral directions from the first convex top portion to the straight segment;

wherein the top has a second convex top portion that engages the second tapered segment, wherein the top extends continuously in both the thickness and lateral directions from the second convex top portion to the straight segment;

wherein an average sipe line is drawn from a point of the sipe 8 millimeters inboard in the lateral direction from the shoulder edge to a point of the sipe 8 millimeters outboard in the lateral direction from the shoulder groove;

wherein a reference plane lies in the longitudinal direction, wherein a sipe bottom point is located in the reference plane at the sipe bottom, wherein a sipe top point is located in the reference plane at the average sipe line, wherein a sipe inclination line extends from the sipe bottom point to the sipe top point, wherein a reference line extends in the thickness direction through the sipe bottom point and does not have a component in the longitudinal direction or the lateral direction, wherein the sipe inclination line is at a sipe inclination angle to the reference line, wherein the sipe inclination angle is greater than 0 degrees, wherein the sipe bottom point is configured to approach a contact patch before the sipe top point upon forward motion.

2. The tread as set forth in claim 1, wherein the shoulder edge portion has a shoulder edge portion depth, and wherein the shoulder groove portion has a shoulder groove portion depth, and wherein the shoulder edge portion depth is the same as the shoulder groove portion depth.

3. The tread as set forth in claim 1, wherein a difference between a depth of the teardrop at the shoulder edge portion and a depth of the teardrop at the middle is greater than two times the diameter of the teardrop in the shoulder edge portion.

4. The tread as set forth in claim 1, wherein the diameter of the teardrop at the shoulder edge portion and at the shoulder groove portion is greater than 2 millimeters.

5. The tread as set forth in claim 1, wherein the diameter of the teardrop at the shoulder edge portion is variable, and wherein the diameter of the teardrop at the groove edge portion is variable.

6. The tread as set forth in claim 1, wherein the middle of the sipe is located at a lateral center of the shoulder rib in the lateral direction.

7. The tread as set forth in claim 1, wherein a spacing in the longitudinal direction between successive sipes of the plurality of sipes is from 15 millimeters to less than 40 millimeters.

8. The tread as set forth in claim 7, wherein the spacing in the longitudinal direction between successive sipes of the plurality of sipes is from 15 millimeters to 18 millimeters.

9. The tread as set forth in claim 1, wherein the tread has a material that has a hysteresis with a max tan delta greater than 0.07 and less than 0.13.

10. The tread as set forth in claim 1, wherein the sipes of the plurality of sipes are castle-type sipes that have steps that are 2 millimeters in length.

11. The tread as set forth in claim 1, wherein the shoulder rib does not have blocks and wherein the shoulder rib does not have any grooves greater than 2 millimeters in width.

12. The tread as set forth in claim 1, wherein the plurality of sipes undulate in shape upon extension from the shoulder edge to the shoulder groove.

* * * * *